United States Patent [19]

Ring

[11] Patent Number: 5,959,576
[45] Date of Patent: Sep. 28, 1999

[54] SATELLITE ATTITUDE DETERMINATION USING GPS AND INTERSATELLITE LINE OF SIGHT COMMUNICATIONS

[76] Inventor: Jeffrey R. Ring, 4600 Orange Grove Way, Palm Harbor, Fla. 34684

[21] Appl. No.: 08/909,781

[22] Filed: Aug. 12, 1997

[51] Int. Cl.[6] ................................ G01S 5/02; B04G 1/38
[52] U.S. Cl. ...................................... 342/357.11; 244/171
[58] Field of Search .............................. 342/357.11, 355; 356/139.03; 701/226, 213; 244/171

[56] References Cited

U.S. PATENT DOCUMENTS

| | | | |
|---|---|---|---|
| 4,680,718 | 7/1987 | Sasaki et al. ............................ | 364/455 |
| 4,883,244 | 11/1989 | Challoner et al. ....................... | 244/171 |
| 5,101,356 | 3/1992 | Timothy et al. ......................... | 364/449 |
| 5,546,309 | 8/1996 | Johnson et al. .......................... | 364/434 |

*Primary Examiner*—Mark Hellner

[57] ABSTRACT

The attitude (yaw, pitch and roll) of a home satellite is determined using position signals, derived from a GPS receiver on the home satellite and GPS receiver on other satellites, that are transmitted between the home satellite and the other satellites by an intersatellite communications link using gimbaled transceivers on the satellites. The home satellite determines its attitude from the gimbal elevation and azimuth and the position vectors between the satellites.

4 Claims, 2 Drawing Sheets

SATELLITE ATTITUDE DETERMINATION USING GPS AND INTERSATELLITE LINE OF SIGHT COMMUNICATIONS

TECHNICAL FIELD

This invention relates satellite attitude control, in particular, satellite attitude determination using GPS and intersatellite line of sight communications.

BACKGROUND OF THE INVENTION

The attitude (roll, pitch and yaw) of an orbiting satellite is controlled to maintain a correct orientation of devices, such as solar panels to the sun and antenna to the earth or space craft. The common way to sense attitude is with object sensors, most commonly star sensors. Star trackers are expensive complicated devices.

DISCLOSURE OF THE INVENTION

An object of the present invention is to determine the attitude of a satellite without on board dedicated attitude determining devices, such as star trackers.

According to the invention, the position of two or more satellites in an orbit is transmitted to one satellite. The one satellite determines the azimuth and elevation to the satellites transmitting their position. The one satellite determines the difference in position in the orbit between it and each of the other satellites using its own position and the transmitted position. It then uses that difference and the azimuth and elevation to each of the other satellites to determine its yaw, pitch and roll.

According to the present invention, satellites determine their position using an on-board GPS receiver and transmit the position to the one satellite by a line of sight (LOS) intersatellite communications link, such as a laser communications system. The one satellite has receiver for each satellite that is oriented in two axis to establish the link and the orientation of the receiver provides the azimuth and elevation to the satellite providing its own position information.

A feature of the present invention, is that it can be deployed in satellite systems that already use an on board GPS and that transmit and receive data, telephony, over a line sight communications link to provide uniform satellite to earth links. Another feature, the invention eliminates the need for star trackers and considerably lowers the cost of each satellite by using information and equipment already on the satellite for other purpose, i.e., the GPS and communications link hardware.

Other objects, benefits and features will become more apparent in light of the following discussion of the invention.

BEST MODE FOR CARRYING OUT THE INVENTION

Figure 1:
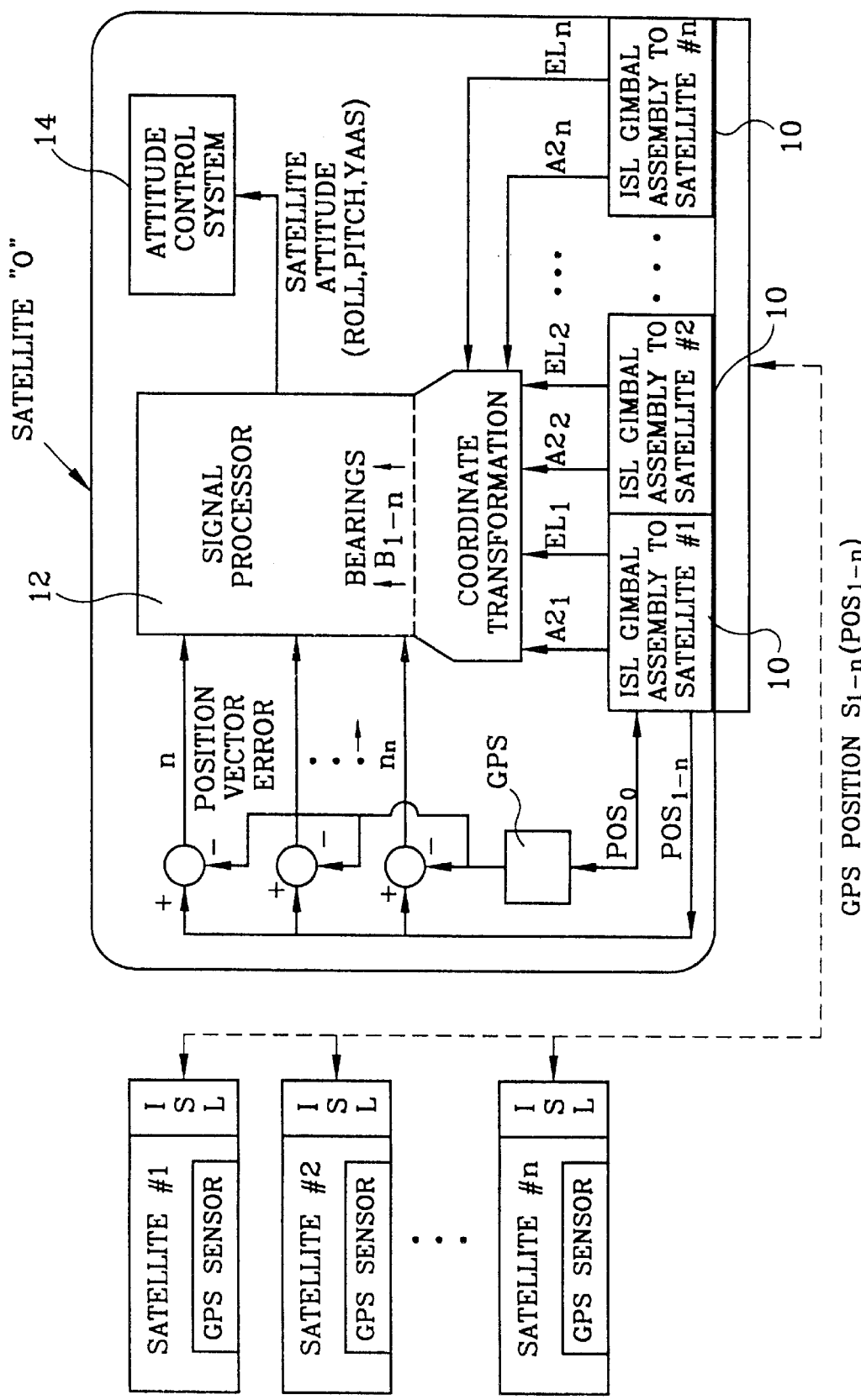
FIG. 1 is a function diagram of a system embodying the present invention.
Figure 2:
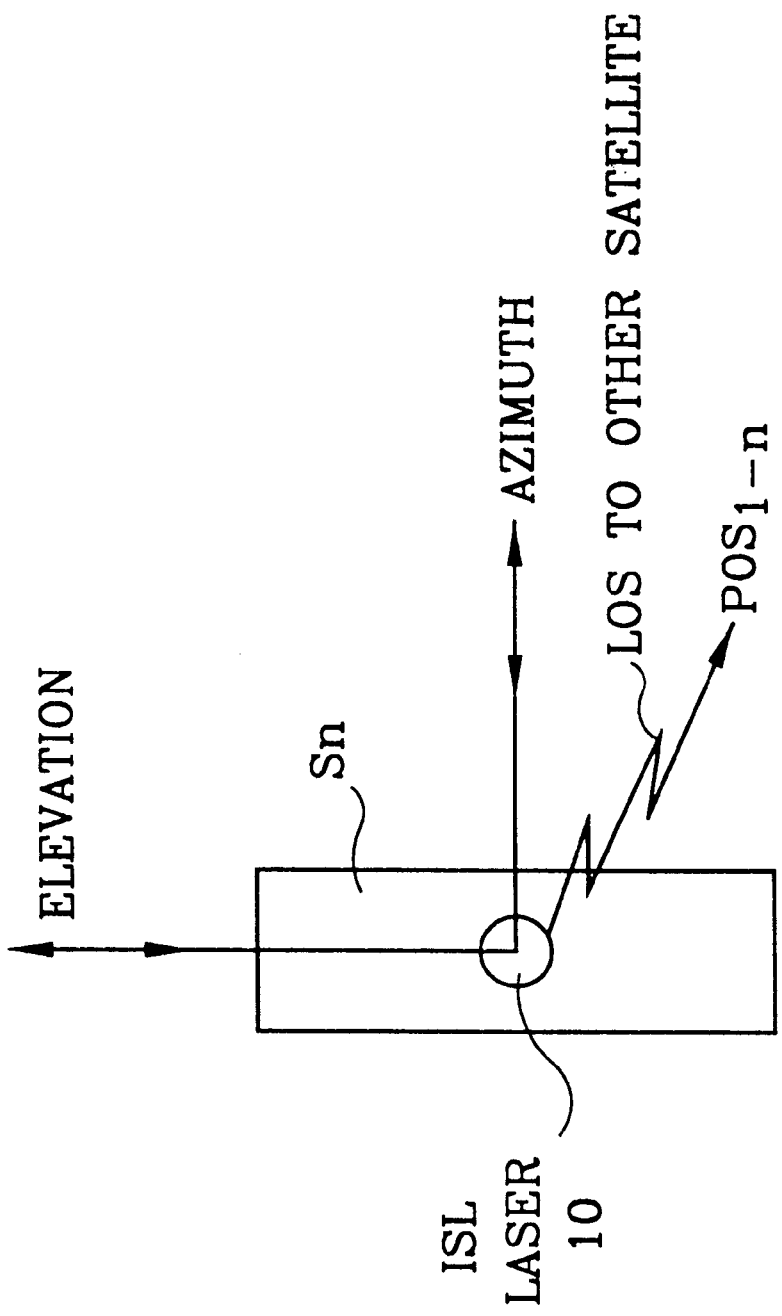
FIG. 2 shows a typical satellite and the two dimensional range of motion of an intersatellite line of sight communciations link to other satellites.

FIG. 1 shows a plurality of satellites $S_n$, assumed to be in an orbit. Each satellite contains its own on board GPS receiver and an intersatellite communication link ISL, such as a laser transceiver system, for relaying data and other information between the satellites that is transmitted from one location to another location on the earth. Each ISL comprises a plurality of gimbaled communication link input/output devices 10, such as a mirror or telescope with a laser based system. The devices 10 are located on the surface of the satellite, as depicted in FIG. 2. The input/output devices 10 can be pointed at a satellite, i.e., oriented in two dimensions (elevation and azimuth) relative to the satellite to establish communications with another satellite. It is assumed that the orientation can be resolved with a resolver to produce signals $El_n$ and $Az_n$. In practice each satellite $S_n$ has a plurality of these lens or directional antennas 10 around its surface, as shown only for satellite $S_o$ enabling communication with satellites three dimensionally simply by pointing the input/output or lens to make the communications connection without rotating the satellite, enabling the satellites attitude relative to the earth to controlled independently for communications and orientation of solar panels.

Each satellite comprises what is shown for satellite 0, which for this discussion is sometimes called the "home" satellite, the other satellites being the "reference" satellites. As stressed previously, in actuality each satellite is a home satellite in determining its own attitude using the GPS position of the other or reference satellites and the line of sight bearing to the reference satellite, which is provided by the orientation of the lens 10.

Each satellite transmits its GPS position, line of sight (LOS), by sighting another satellite with a lens 10. Using satellite SO as example, it receives, signals $Pos_{1-n}$, by an associated lens 10 for each satellite and likewise sends its GPS position back to the other satellites using the same lens. Each lens 10 produces an elevation and azimuth signal $Az_n$, $El_n$, that represents the LOS to the other satellite. Those signals are applied to a signal processor 12, which is programmed, as explained below, to perform a coordinate transformation that yield the bearing $B_{1-n}$, to each satellite. The GPS on satellite SO produce the local or home GPS position signal, $Pos_0$, which, in addition to being applied to the lens 10 for transmission to the other satellites, is subtracted from received positions for the other satellites. The difference between the GPS position of the home satellite and the position of the remote or what may be called "reference" satellite, is position vector, signal $r_n$, in earth or GPS reference coordinates to the reference satellite. The difference signal is applied to the signal processor 12 produce attitude signals (yaw, pitch and roll) that are supplied to an attitude control system 14 that uses those signals to control the satellite's attitude devices, such as momentum wheels, to regulate the satellite's attitude.

The signal processor 12 is programmed to carry out the following attitude determination process using the signals generated as described above. (Well known, signal processor components such as a central processing unit, memories, clocks and such are not shown.) The angles $El_n$, and $Az_n$ specify the direction to the target or reference satellite. This Cartesian coordinate conversion relates the gimbal azimuth (Az) and elevation (El) angle deflections to the line of sight (LOS) unit vector ($\hat{b}$):

$$(\hat{b}) = \begin{bmatrix} \cos(El)\cos(Az) \\ \cos(El)\sin(Az) \\ \sin(El) \end{bmatrix} \qquad (1)$$

The direction to target satellites is also specified in an earth referenced frame by the position vector $\vec{r}_i$, which represents the difference between the GPS measured position of satellite 1 and satellite 0. The earth referenced position vectors $\vec{r}_i$ are converted to unit vectors by dividing each by its vector magnitude:

$$\hat{r}_i = \frac{\vec{r}_i}{\|\vec{r}_i\|} \tag{2}$$

The direction cosine matrix A that defines the spacecraft attitude is obtained by first forming two matrices—R and B. The matrix R is formed by concatenating the n earth referenced unit vectors:

$$R = [\hat{r}_1 \hat{r}_2 \hat{r}_3 \ldots \hat{r}_n] \tag{3}$$

The number of unit vectors n is determined by the number of laser communication ("com") systems resident on a satellite. A minimum of 2 are required for attitude determination. Similarly, the matrix B is formed by concatenating the body referenced unit vectors (both R and B are 3×n matrices):

$$B = [\hat{b}_1 \hat{b}_2 \hat{b}_3 \ldots \hat{b}_n] \tag{4}$$

Next, the matrices R and B are decomposed using the singular value decomposition (SVD). The singular value decomposition is a mathematical tool often used for analyzing a mapping from one vector space (such as an earth referenced vector) into another vector space (such as a body reference vector). The SVD of matrices R and B are given by the expressions $$R = U_1 \sum_1 V_1' \text{ and } B = U_2 \sum_2 V_2'.$$

where $U_1$ and $U_2$ are 3×3

$$\sum_1 \text{ and } \sum_2$$

are 3×n, and $V'_1$ and $V'_2$ are n×n. The matrices $U_1, U_2, V'_1$, and $V'_2$ are unitary (i.e. the columns are orthogonal and have unit magnitude). The matrices $$\sum_1 \text{ and } \sum_2$$

are diagonal with real non-negative elements. The elements of $$\sum_1 \text{ and } \sum_2$$

are known as singular values.

After the R and B matrices have been formed and decomposed using the SVD, the direction cosine matrix A can be obtained by multiplying the unitary matrix $U_2$ with the transpose of the unitary matrix $U_1$.

$$A = U_2 U'_1 \tag{5}$$

The attitude or direction cosine matrix A has three row and three columns as shown in equation 6.

$$A = \begin{bmatrix} A_{11} & A_{12} & A_{13} \\ A_{21} & A_{22} & A_{23} \\ A_{31} & A_{32} & A_{33} \end{bmatrix} \tag{6}$$

The elements of the attitude matrix can be used to derive the satellite roll, pitch, and yaw angles. The satellite pitch attitude $\theta$ is calculated using equation 7.

$$\theta = \tan^{-1}\left(\frac{-A_{13}}{\sqrt{A_{11}^2 + A_{12}^2}}\right) \tag{7}$$

The satellite roll and yaw computations are defined by equations 8 and 9 respectively.

$$\phi = \tan^{-1}\left(\frac{A_{12}}{A_{11}}\right) \tag{8}$$

$$\psi = \tan^{-1}\left(\frac{A_{23}}{A_{33}}\right) \tag{9}$$

Alternatively, attitude can be described using quaternions. Quaternions are employed to avoid computational singularites when the pitch attitude $\theta$ approaches 90 degrees. An attitude quaternion q contains four parameters $$q = \begin{bmatrix} s \\ u \\ v \\ w \end{bmatrix} \tag{10}$$

where s,u,v,w are defined in terms of the attitude matrix A according to equations 11–14.

$$s = \frac{1}{2}\sqrt{1 + A_{11} + A_{22} + A_{33}} \tag{11}$$

$$u = \frac{1}{4}\frac{(A_{23} - A_{32})}{s} \tag{12}$$

$$v = \frac{1}{4}\frac{(A_{31} - A_{13})}{s} \tag{13}$$

$$w = \frac{1}{4}\frac{(A_{12} - A_{21})}{s} \tag{14}$$

With the benefit of the previous discussion of the invention, one of ordinary skill in the art may be able to modify the invention, and the functions and functional elements described above, in whole or in part without departing from the true scope and spirit of the invention.

I claim:

1. A method characterized by:
    producing a first signal with a GPS receiver on board a first satellite, the first signal manifesting a position of the first satellite on a first frame of reference and transmitting the first signal from the first satellite to a second satellite over a biaxially aimed line of sight communications path;
    producing a second signal with a GPS receiver on board a third satellite, the second signal manifesting a position of the third satellite on the first frame of reference and transmitting the second signal from the third satellite to the second satellite over a biaxially aimed line of sight communications path;

producing a line of sight signal on the second satellite that indicates an azimuth and elevation from the second satellite to the first satellite and the third satellite;

producing position difference signals with a signal processor on board the second satellite, the position difference signals manifesting the difference in position on the first frame of reference between the second satellite and the first and third satellites as a function of the first and second signals and a third signal produced by a GPS receiver on board the second satellite, the third signal manifesting the position of the second satellite on the frame of reference; and controlling the attitude of the second satellite using signals produced by the signal processor and manifesting desired yaw, pitch and roll derived by correlating the position difference signals and each line of sight signal to a common frame of reference.

2. The method of claim 1, further characterized by:

producing the line of sight signal by resolving the elevation and azimuth, on the second satellite, of a laser directed at each of the first and second satellites for providing an intersatellite communications link between the first, second and third satellites.

3. A satellite characterized by:

first means on board one of a plurality of remote satellites for receiving from each of the plurality of remote satellites a remote position signal, produced by a GPS receiver on each of the of the remote satellites, that indicates the position of the remote satellite on a first frame of reference and for producing a position vector signal for each of the plurality of satellites as a function of the remote position signal and the position of the one satellite, the position vector signal representing the bearing from the one satellite to the remote satellite on the first frame of reference;

second means for providing a line of sight communications link to each remote satellite from the one satellite for transmitting each remote position signal to the one satellite and for providing a sight signal on the one satellite representing the azimuth and elevation from the one satellite to the each remote satellite;

signal processing means on the one satellite for providing attitude signals representing the yaw, pitch and roll of the satellite around the satellite axis by correlating the position vector signal and the sight signal to the satellite axis of the one satellite based on the orbit position of the satellite;

a GPS receiver on board the satellite for providing the orbit position of the satellite; and a satellite attitude system responsive to the attitude signals for controlling the yaw pitch and roll of the satellite.

4. A method characterized by:

producing a GPS position with a GPS receiver on each of a plurality of satellites in a location around the earth;

transmitting the GPS position signal to one of the plurality of satellites by a line of sight communications link comprising a dual axis pointing laser receiver on one satellite and a laser transmitter on a second satellite;

determining the elevation and azimuth from the one satellite and each of the plurality of satellites from the orientation of the receiver;

determining the attitude of the one satellite using the elevation and azimuth to each of the plurality of satellites and the position signals received at the one satellite by the communications link and the position produced from the GPS receiver on board the one satellite.

* * * * *